United States Patent [19]
Rogers

[11] Patent Number: 5,228,754
[45] Date of Patent: Jul. 20, 1993

[54] WHEEL BALANCE WEIGHT

[75] Inventor: Larry K. Rogers, Henderson, Ky.

[73] Assignee: Accuride Corporation, Henderson, Ky.

[21] Appl. No.: 913,780

[22] Filed: Jul. 14, 1992

Related U.S. Application Data

[63] Continuation of Ser. No. 774,729, Oct. 9, 1991, abandoned, which is a continuation of Ser. No. 630,726, Dec. 20, 1990, abandoned, which is a continuation of Ser. No. 444,055, Nov. 30, 1989, abandoned.

[51] Int. Cl.$^5$ .............................................. B60B 21/00
[52] U.S. Cl. ................................. 301/5.21; 301/37.34; 24/295; 24/563
[58] Field of Search .................. 301/5 BA, 5 B, 37 C, 301/37 CD, 37 T; 24/295, 563

[56] References Cited

U.S. PATENT DOCUMENTS

| | | | |
|---|---|---|---|
| 2,433,762 | 12/1947 | Kalajian | 301/5 B |
| 2,827,332 | 3/1958 | Chamberlain | 301/37 CD |
| 2,937,426 | 5/1960 | Barnes | 24/295 |
| 3,012,823 | 12/1961 | Spisak | 24/295 X |
| 3,740,800 | 6/1973 | Meyer | 24/295 |
| 3,868,147 | 2/1975 | Beisch | 301/37 C |

FOREIGN PATENT DOCUMENTS

| | | | |
|---|---|---|---|
| 1430356 | 11/1966 | France | 301/5 B |
| 646067 | 10/1962 | Italy. | |

Primary Examiner—Russell D. Stormer

[57] ABSTRACT

A standardized wheel balance weight with a weight, a resilient clip attached at one end to the weight, and the opposite end of the clip split into at least two clip portions each defining a different unloaded gap dimension with respect to the weight to accommodate different rim flange thicknesses and contours. The opposite end of the clip may be trifurcated or split into four or more clip portions to define the two different unloaded gap dimensions. The opposite end of the clip also may be at least trifurcated into at least three clip portions to define at least three different unloaded gap dimensions with respect to the weight. Five clip portions may define the three different unloaded gap dimensions. The clip is self-retaining in all instances.

7 Claims, 1 Drawing Sheet ion of Ser. No. 07/630,726 filed Dec. 20, 1990, which is

WHEEL BALANCE WEIGHT

This application is a continuation of application Ser. No. 07/774,729 filed Oct. 9, 1991 which is a continuation of Ser. No. 07/630,726 filed Dec. 20, 1990, which is a continuation of application Ser. No. 07/444,055 filed Nov. 30, 1989, all now abandoned.

BACKGROUND OF THE INVENTION

This invention relates to balance weights for vehicle wheels, in particular those of automobiles and trucks. More specifically, this invention relates to wheel balance weights of the clip type which are attached to rims upon which tires are mounted.

A number of prior means have been used to balance wheels of automobiles and trucks, including wheel balance weights which attach to the rim by clips, adhesives, inserts into grooves, or other means. Hub caps and wheel covers also have been used to balance wheel assemblies, as have dynamic balancers which attach internally or externally to the tire/wheel assembly and have a mass which moves to balance the wheel after the wheel turns at a certain speed. Some of these and other means are disclosed in U.S. Pat. Nos. 2,433,762; 3,495,877; 3,669,500; 4,591,210; 4,720,149; 4,728,154 and 4,755,006; and Italian patent No. 646,067. Each means has its own inherent advantages and disadvantages relating to such criteria as standardization, cost, appearance, performance, ease of manufacture, ease of use, etc.

In particular, as to wheel balance weights of the clip type, a resilient clip is attached to a lead weight configured to nest under the flange of the rim so that centrifugal force will not throw the weight off from the rim at high wheel speeds. The clip in turn attaches the weight to the rim. A disadvantage of the present clip-on weights is that the unloaded gap dimension between the clip and lead weight, prior to clipping onto the rim, must be within a certain range to fit a given rim flange thickness. If the gap is too small, the weight and clip will be difficult to attach to the rim, and if forced onto the rim, the clip will be sprung such that poor weight retention will result. On the other hand, if the unloaded gap dimension between the clip and lead weight is too large, the result equally will be poor retention. As a further complicating factor, rim flange thicknesses and contours vary. Accordingly, different clip-type weights having different unloaded gap dimensions between the clip and weight must be manufactured and inventoried in order to accommodate the different rim flange thicknesses and contours. Excessive ordering, inventory, and carrying costs can result. Further, confusion can arise as to which gap dimensions fit which rim flanges in various circumstances.

Certain attempts have been made to solve the above-described problems of clip-type weights, one being described in U.S. Pat. No. 4,728,154 wherein two clips are respectively provided on opposite sides of the weight to provide two different gap dimensions. The particular gap dimension selected depends on which of two mounting positions is selected for the balance weight under the rim flange. This has the disadvantage of needing to select one of the two gap dimensions and needing to orient the balance weight before attaching to the rim, regardless of whether the weight is applied by hand or automated equipment, and the cost of manufacturing and assembling the clip would be greater than that of previously-known clip-type weights. Other variations to solve the above clip-type weight problems are shown in U.S. Pat. No. 3,495,877, having abradable protrusions on the lead balance weight which can be removed to a greater or lesser degree to fit different rim flange thicknesses, or having a separate spring part next to the weight so that rim flanges of different thicknesses can be held between two springs; and, U.S. Pat. No. 3,669,500, having a balance weight with a separate adjustable holding clip rather than an integral holding clip. Both of these variations have apparent manufacturing and/or assembly disadvantages.

SUMMARY OF THE INVENTION

The wheel balance weight of the present invention provides a standardized or universal clip-type weight which can be used on a range of rim flange thicknesses and/or contours, is inexpensive and simple to manufacture, and is inexpensive and simple to assemble to the rim flange without requiring orientation and/or selection decisions. Ordering, inventory, and carrying costs are greatly simplified and reduced.

In the present invention, a single clip is embedded at one end in the lead weight. The clip at its opposite end, where it will pass over the rim flange to clamp the flange between the clip and weight, is at least bifurcated into at least two clip portions each defining a different unloaded gap dimension from the other. The clip portion with the smaller unloaded gap dimension will properly clamp a thinner rim flange or a particular contour; the clip portion with the larger unloaded gap dimension will properly clamp a thicker rim flange or a different contour. A preferred embodiment of the invention has the clip means trifurcated at its opposite end into three clip portions, two of which define one unloaded gap dimension and the other of which defines a different unloaded gap dimension. Still further embodiments provide for at least three separate unloaded gap dimensions to properly clamp a wide range of rim flange thickness and/or contours, one of such embodiments including having the clip means at its opposite end split into five clip portions. In all instances the clip is self-retaining.

DESCRIPTION OF EMBODIMENTS

Figure 1:
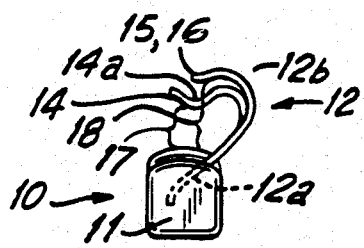
FIG. 1 is a side elevation of the wheel balance weight of the present invention.
Figure 2:
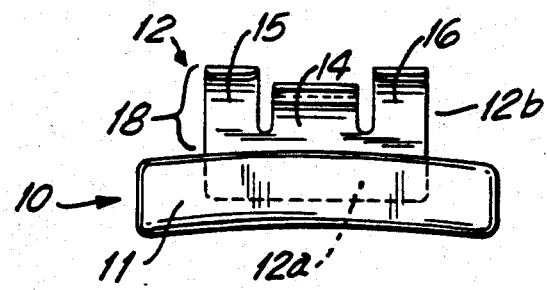
FIG. 2 is a front view of the wheel balance weight of the present invention, viewed from the left (wheel) side of FIG. 1.

Referring to FIGS. 1 and 2, wheel balance weight 10 is illustrated in side elevation being comprised of lead weight 11 and resilient steel clip means 12. One end 12a of clip means 12 is embedded in the lead weight 11. The opposite end 12b of clip means 12, where it passes over rim flange 13 (see FIG. 3) to clamp the rim flange between opposite end 12b and weight 11, is shown in preferred embodiment as trifurcated into three clip portions 14,15,16. In the unloaded condition of clip means 12 (prior to the wheel balance weight 10 being applied to the rim flange), clip portion 14 defines one unloaded gap dimension 17 between clip portion 14 and the opposing lead weight 11. Clip portions 15 and 16 define a second, larger, unloaded gap dimension 18 between clip portions 15,16 and the opposing lead weight 11.

Figure 3:
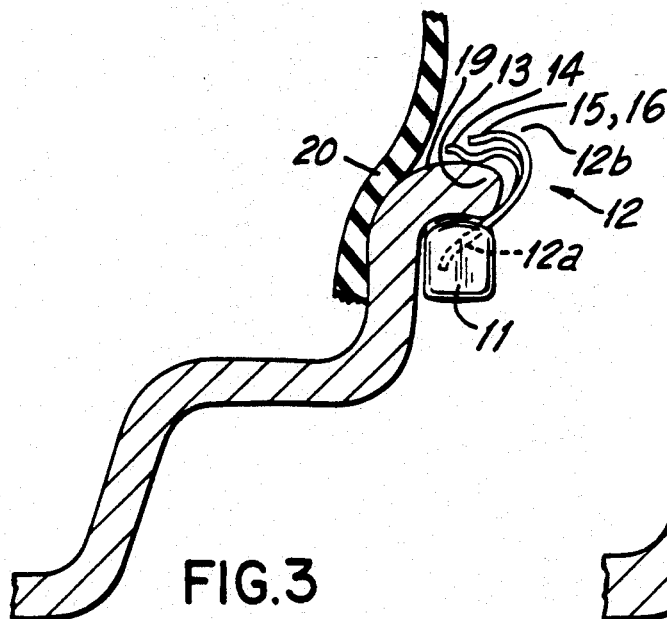
FIG. 3 is a side elevation of the wheel balance weight of the present invention mounted on a thin rim flange shown in cross-section.
Figure 4:
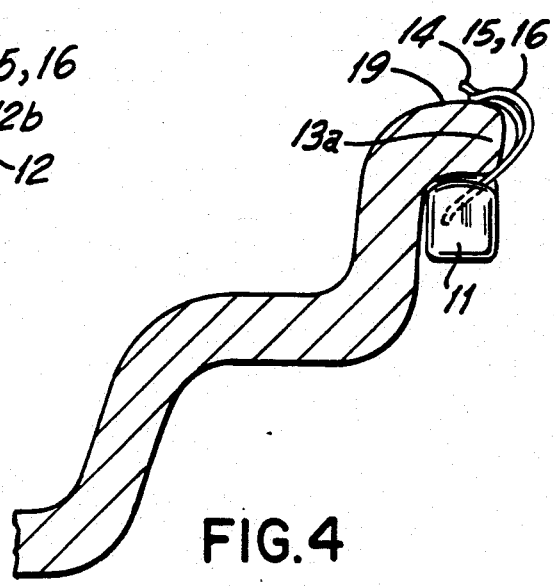
FIG. 4 is a side elevation of the wheel balance weight of the present invention mounted on a thicker rim flange shown in cross-section.

Referring now to FIG. 3, when balance weight 10 is applied to a thinner rim flange 13, clip portion 14 serves as the retaining means to clamp the flange 13 with lead weight 11 nested under the flange. Clip portions 15 and 16 do not come into play. However, referring to FIG. 4, where the same balance weight 10 of the present invention is applied to a thicker rim flange 13a, clip portion 14 is pushed upwardly, and clip portions 15 and 16 now serve as the retaining means (along with clip portion 14 if not sprung) to clamp the flange 13a with lead weight 11. In this manner, it can be seen that a standardized balance weight of the present invention is used to properly accommodate rim flanges of various thicknesses.

Figure 7:
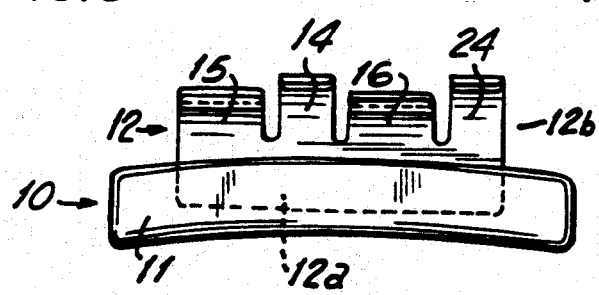
FIG. 7 is a front view of a further embodiment of the wheel balance weight of the present invention.

Although FIGS. 1-4 have illustrated clip portion 14 defining a smaller unloaded gap dimension and clip portions 15,16 defining the larger unloaded gap dimension, these functions may be reversed with clip portion 14 then defining the larger unloaded gap dimension and clip portion 15,16 defining the smaller unloaded gap dimension. Further, although FIGS. 1 and 2 illustrate a preferred symmetrical embodiment, opposite end 12b of clip means 12 may be bifurcated into two clip portions (i.e., 14,15 with clip portion 16 omitted), one of the clip portions providing the smaller unloaded gap dimension and the other clip portion providing the larger unloaded gap dimension, all again to accommodate rim flanges of different thicknesses and/or contours. Or, as shown in FIG. 7, opposite end 12b of clip means 12 may be split into four clip portions, two of which provide the smaller unloaded gap dimension (i.e., 15,16) and two of which provide the larger unloaded gap dimension (i.e., 14 and a further clip portion 24 added outside of either clip portion 15 or clip portion 16). FIGS. 1-4 also illustrate optional bend 14a in clip portion 14 to facilitate sliding clip portion 14 over rim flanges 13,13a.

Referring to FIG. 3, it will be noted that the wheel balance weight 10 is self-retaining in that its clip portions 16,15 and/or 14 contact the top surface 19 of the rim flange 13 or 13a and clamp the rim flange with the lead weight 11. Tire 20, shown in FIG. 3, does not act as a primary retaining means, in contrast to the disclosure of Italian Pat. No. 646,067 wherein a clip means extends over the top and down the side of the rim flange to the tire bead seat where protrusions on the clip are attached to the tire bead.

Figure 5:
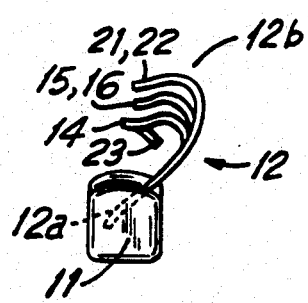
FIG. 5 is a side elevation of a further embodiment of the wheel balance weight of the present invention; and, FIG. 6 is a front view of the wheel balance weight of FIG. 5, viewed from the left (wheel) side of FIG. 5.
Figure 6:
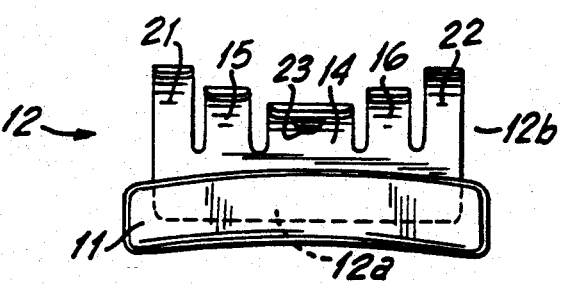

Turning to FIGS. 5 and 6, a further embodiment of the present invention is shown defining three unloaded gap dimensions to properly accommodate quite wide variations in flange thickness and/or contour. Similarly numbered parts correspond to the parts and their functions of FIGS. 1-4. Here, however, the opposite end 12b of clip means 12 is split into five clip portions 14,15,16, 21 and 22. Clip portions 21 and 22 define the third unloaded gap dimension with opposing weight 11, the third dimension being greater than the second and first unloaded gap dimensions defined by clip portions 15,16 and 14, respectively. Thin rim flanges will be retained by clip portion 14; thicker rim flanges will be retained by clip portions 15,16 (and 14 if not sprung); and even thicker rim flanges will be retained by clip portions 21,22 (and clip portions 14,15,16 to the extent not sprung).

Similarly as with the embodiment of FIGS. 1 and 2, clip portion 14 may provide the larger or intermediate unloaded gap dimension, clip portions 15,16 may provide the larger or smaller unloaded gap dimension, and clip portions 21,22 may provide the intermediate or smaller gap dimension. Also, though less preferred, clip portions 16,22 (or 15,21) may be omitted to still provide an embodiment with three gap dimensions. FIG. 5 also illustrates spur 23 on clip portion 14, which may optionally be provided on various clip portions to improve retention on particularly those rims made of non-ferrous materials (such as aluminum or magnesium).

It will be understood that various modifications may be made in the present invention without departing from the spirit and scope of the invention as hereafter claimed.

What is claimed is:

1. A wheel balance weight system for use with rim flanges of different thicknesses and/or configurations, comprising a weight for nesting under the rim flange; self-retaining resilient clip means for retaining the weight under the rim flange, said clip means being attached at one end to the weight and having an opposite end for passing over the rim flange and clamping the flange in a gap between the weight and opposite end of the clip means; the clip means at its opposite end, at the point where it passes over the rim flange, being at least bifurcated into at least two clip portions; one of the at least two clip portions defining a larger unloaded gap dimension with respect to the weight; and, the other of the at least two clip portions defining a smaller unloaded gap dimension with respect to the weight.

2. The invention defined in claim 1, wherein the clip means is trifurcated at its opposite end into three clip portions, the two outer clip portions defining the same larger or smaller unloaded gap dimension with respect to the weight, and the middle clip portion defining the different smaller or larger unloaded gap dimension with respect to the weight.

3. The invention defined in claim 1, wherein the clip means at its opposite end, at the point where it passes over the rim flange, is split into at least three clip portions, and each of three clip portions defines an unloaded gap dimension with respect to the weight different from the unloaded gap dimensions defined by the other two clip portions.

4. The invention defined in claim 3, wherein the clip means at its opposite end, at the point where it passes over the rim flange, is split into five clip portions, the middle clip portion defining one unloaded gap dimension, the two clip portions adjacent the middle clip portion defining a different unloaded gap dimension, and the remaining two clip portions defining a still different unloaded gap dimension.

5. The invention defined in claim 1, wherein at least one of the clip portions has a bend to facilitate mounting the wheel balance weight.

6. The invention defined in claim 1, wherein at least one of the clip portions has a spur member to facilitate retention of the clip means on the rim flange.

7. The invention defined in claim 1, wherein the clip means at its opposite end, at the point where it passes over the rim flange, is split into at least four clip portions, two of which define one unloaded gap dimension with respect to the weight different from a second unloaded gap dimension defined by two other clip portions.

* * * * *